(12) United States Patent
Hodri

(10) Patent No.: US 11,086,580 B2
(45) Date of Patent: Aug. 10, 2021

(54) METHOD FOR CHECKING A VALIDITY OF IMAGE DATA

(71) Applicant: Robert Bosch GmbH, Stuttgart (DE)

(72) Inventor: Siegfried Hodri, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/469,487

(22) PCT Filed: Nov. 8, 2017

(86) PCT No.: PCT/EP2017/078626
§ 371 (c)(1),
(2) Date: Jun. 13, 2019

(87) PCT Pub. No.: WO2018/108395
PCT Pub. Date: Jun. 21, 2018

(65) Prior Publication Data
US 2020/0117412 A1 Apr. 16, 2020

(30) Foreign Application Priority Data
Dec. 16, 2016 (DE) .......................... 102016225349.2

(51) Int. Cl.
*G09G 5/02* (2006.01)
*G06F 3/14* (2006.01)
*G09G 3/34* (2006.01)

(52) U.S. Cl.
CPC ......... *G06F 3/1415* (2013.01); *G09G 3/3406* (2013.01); *G09G 5/02* (2013.01);
(Continued)

(58) Field of Classification Search
CPC .. G09G 5/02; G09G 2330/12; G09G 2360/16; G09G 3/3406; G09G 2380/10; G06F 3/1415; G06T 2207/30168
See application file for complete search history.

(56) References Cited

U.S. PATENT DOCUMENTS

| 8,570,379 B1 * | 10/2013 | Valdez | G06T 7/0002 348/180 |
| 2003/0063802 A1 * | 4/2003 | Li | H04N 1/4092 382/199 |

(Continued)

FOREIGN PATENT DOCUMENTS

| DE | 69428089 T2 | 4/2002 |
| DE | 60109278 T2 | 3/2006 |

(Continued)

OTHER PUBLICATIONS

International Search Report for PCT/EP2017/078626, dated Jan. 26, 2018.

*Primary Examiner* — Antonio A Caschera
(74) *Attorney, Agent, or Firm* — Norton Rose Fulbright US LLP; Gerard A. Messina

(57) ABSTRACT

A method for checking a validity of image data, in which the image data is assigned to a display device. The image data are classified into at least two groups as a function of a color value of the image data and/or of a brightness value of the image data, a test value being ascertained from the image data of the at least one group for the respective group. The ascertained test value of a group is compared with a predefined test value of the respective group. A validity of the image data is established when the ascertained test value of the respective group and the predefined test value of the respective group coincide. An invalidity of the image data is established when the ascertained test value of the respective group and the predefined test value of the respective group do not coincide.

35 Claims, 4 Drawing Sheets

(52) U.S. Cl.
CPC ............ *G06T 2207/30168* (2013.01); *G09G 2330/12* (2013.01); *G09G 2360/16* (2013.01); *G09G 2380/10* (2013.01)

(56) References Cited

U.S. PATENT DOCUMENTS

2016/0138968 A1* 5/2016 Staudenmaier .......... G09G 5/10
  250/208.1
2016/0224859 A1   8/2016 Usikov

FOREIGN PATENT DOCUMENTS

| | | |
|---|---|---|
| DE | 102007048608 A1 | 4/2009 |
| EP | 1986130 A1 | 10/2008 |
| EP | 2779151 A1 | 9/2014 |
| WO | 2015008104 A1 | 1/2015 |

* cited by examiner

METHOD FOR CHECKING A VALIDITY OF IMAGE DATA

FIELD OF THE INVENTION

The present invention relates to a method for checking a validity of image data.

BACKGROUND INFORMATION

A test device for checking the validity of display signals relating to a predefined image is known from DE 10 2007 048 608 A1, including a device for ascertaining image data from the display signals, including a device for determining a test value of the image data and including a comparator unit for comparing the ascertained test value with a stored test value related to the image, a validity of the display signals being established in the event the two test values coincide.

SUMMARY OF THE INVENTION

The present invention relates to a method for checking a validity of image data, the image data being assigned to a display device. The image data are classified into at least two groups as a function of a color value of the image data and/or as a function of a brightness value of the image data, a test value for the respective group being ascertained from the image data of at least one group. The ascertained test value of a group is compared with a predefined test value of the respective group. A validity of the image data is established only when the ascertained test value of the respective group and the predefined test value of the respective group coincide. An invalidity of the image data is established when the ascertained test value of the respective group and the predefined test value of the respective group do not coincide.

Image data may be understood to mean a set of individual digital data values, each of which specifies image values for individual pixels of a display. A set of image data in RGB format may be a set of data, each of which specifies a brightness value for the individual colors.

The method for checking a validity of image data has the advantage that errors occurring during a transmission of image data, for example, to a display device and/or a display, may be detected. This may ensure that the correct pieces of information are displayed on a display, which is of great importance, in particular, in the case of safety-relevant pieces of information, for example, in the case of warning symbols. The method is advantageous, in particular, in a use in a motor vehicle, since in such displays a correct display of pieces of information, for example, warning signals and/or script or letters is important.

By classifying the image data into at least two groups, it is possible to calculate the test value for a group, in each case from the image data of the respective group. In this way, the method becomes safer, simpler and may be carried out more quickly for the purpose of checking due to a reduced data set, as a result of which computing capacity may be saved.

Another advantage is that the method may be used, in particular, also for checking symbols, for example, warning symbols on an animated background. If, for example, an area behind a symbol changes, it may be ensured based on the classification into at least two groups that the symbol is recognized and a validity of the image data may be checked with the aid of the method.

In one advantageous embodiment, a first group of image data is assigned all image data having a maximum color value and/or having a maximum brightness value. This may ensure that, for example, all image data used for representing a symbol, for example, all image data of a warning symbol and/or of a script or letters, which are represented with the aid of a maximum color value and/or with a maximum brightness value, are assigned to the first group.

In one refinement, a second group of image data is assigned all image data having a color value and/or a brightness value between a first predefined limit of a maximum color value and/or of a maximum brightness value and a second predefined limit of a threshold of a color value and/or of a brightness value. The second group is advantageously assigned the image data situated at the edge of a symbol, for example, of a warning symbol, and which do not have the maximum color value and or the maximum brightness value. These image data at the edge of a symbol are used, in particular, to smooth the color transition and/or the brightness transition between a symbol and a background.

Furthermore, a third group of image data is advantageously assigned all image data having a color value and/or a brightness value below and/or equal to a threshold of a color value and/or of a brightness value. The image data in this group are, in particular, darker areas with respect to a depicted symbol, which may be the background of the symbol. Since a threshold of a color value and/or a brightness value is considered here, animated image data or backgrounds may advantageously also be classified into this group. An animated background may, for example, be a map of a navigation and/or a switchable background image of the display device. In addition, the threshold may be defined as a function of the brightness value, the threshold amounting to between 25% and 50% of the maximum brightness value of the image data. The threshold may further be defined as a function of the color value, the threshold amounting to between 25% and 50% of the maximum color value of the image data.

In one specific embodiment, the test value of a group is ascertained by ascertaining the number of all image data of a group. The advantage of the summation of all image data of a group is that the method may be simply, quickly and reliably carried out, with less effort being required. In the process, the computing demands as well as the required memory capacity may be kept to a minimum.

One advantageous embodiment provides that the test value of a group is ascertained by ascertaining an average of a color value of the image data and/or of a brightness value of the image data and/or a standard deviation from the positions of the image data of a group. In this way, it is possible to calculate a statistical measure for the scattering of the image data and/or the focus of the image data. The calculation requires minimal computing demands and minimal memory capacity.

In one refinement, the test value is ascertained for a first group and for a second group, a validity of the image data being established only when the ascertained test value of the first group and a predefined test value of the first group, as well as the ascertained test value of the second group and a predefined test value of the second group coincide. In this way, the robustness and the reliability of the method may be ensured. By checking test values of at least two groups, it is advantageously possible to detect errors more easily and/or more quickly.

Image data of a defined area on a display device may, in particular, also be used to check the validity of the image data of the defined area on the display device. In this way, only the area on a display device may be checked on which the image data to be checked are to be displayed, for example, in the area in which the displayed symbol is expected. The method may be carried out more quickly and reliably as a result of the reduced data volume, whereby computing capacity and/or memory capacity may be saved. It may further be ensured that the method is falsified by additional symbols on the display device.

In one refinement, a validity and/or an invalidity of the image data may be established for capturing tolerances when the ascertained test value of a group deviates by a certain percentage from the predefined test values of the respective group. For example, a validity of the image data may be established when the ascertained test value of a group deviates by less than 5% to 30%, in particular, by 10% from the predefined test value of the respective group and/or an invalidity of the image data is established when the ascertained test value of a group deviates by more than 5% to 30%, in particular, by 10% from the predefined test value of the respective group. This may ensure that individual pixels may include display errors without an error message being generated and/or without the display being switched off due to a single erroneous pixel.

In one advantageous embodiment, an error message and/or an interrupt is generated if the validity of the image data is not established. A display device for displaying image data may, for example, be at least partly or completely switched off if the validity of the image data is not established and/or if an error message is generated. This may ensure that an observer, for example, a driver of a vehicle and/or passenger is not disturbed or falsely informed by erroneously displayed pieces of information and/or images. In the case of a switch-off, for example, the illumination of the display device may be switched off and/or the display of image data may be interrupted, for example, with the aid of the display of a uniform color shade, in particular, a black color shade, on the display. An error message may, for example, also be understood to mean an error flag. Instead of an error message and/or an interrupt, a reset of the display may also be triggered. Accordingly, the display may then be switched off and/or then restarted, for example.

A control unit of a display system is also provided, the control unit including a monitoring module and the display device being assigned image data. The image data are classified into at least two groups as a function of a color value of the image data and/or of a brightness value of the image data. The monitoring module is configured to ascertain from the image data of at least one group a test value for the respective group. The monitoring module is further configured to compare the ascertained test value of a group with a predefined test value of the respective group, the monitoring module establishing a validity of the image data when the ascertained test value of the respective group and of the predefined test value of the respective group coincide. The monitoring module is configured to establish an invalidity of the image data when the ascertained test value of the respective group and the predefined test value of the respective group do not coincide.

Exemplary embodiments of the present invention are depicted in the drawings and are explained in greater detail in the following descriptions. Identical reference numerals are used for elements which are represented in the various figures and act similarly, a repeated description of these elements being omitted.

DETAILED DESCRIPTION

Figure 1:
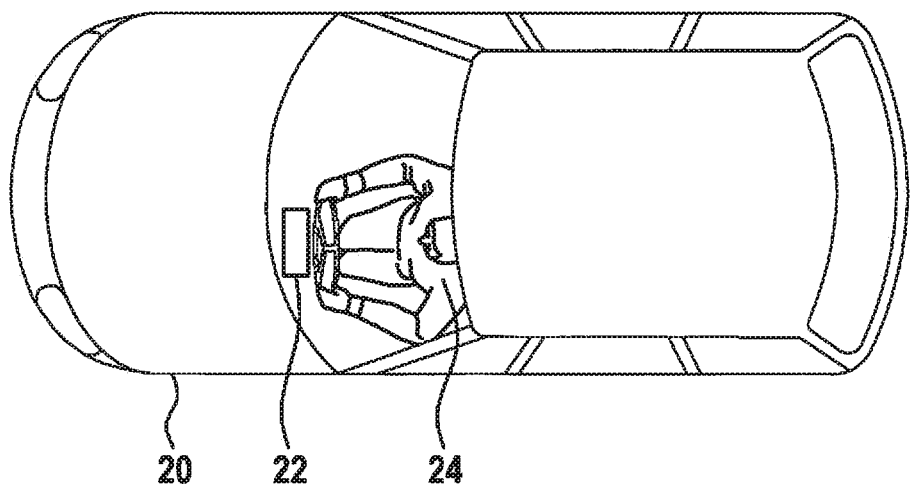
FIG. 1 schematically shows a representation of a top view of a vehicle that includes a display device according to one exemplary embodiment of the present invention.

FIG. 1 shows an embodiment of a schematic representation of a top view of a vehicle 20, for example, of an automobile, including a display device 22. Display device 22, for example, an LCD, is situated in vehicle 20 in such a way that an observer 24 may observe display device 22, display device 22 being able to output pieces of information to observer 24. These pieces of output information may, for example, be pieces of information about the state of the vehicle, such as the speed, the RPM indicator and or the fuel level and/or pieces of information regarding navigation instructions and/or pieces of information from vehicle safety systems and/or pieces of information of the entertainment system. Alternatively, display device 22 may also be mounted in the center console of vehicle 20.

Figure 2:
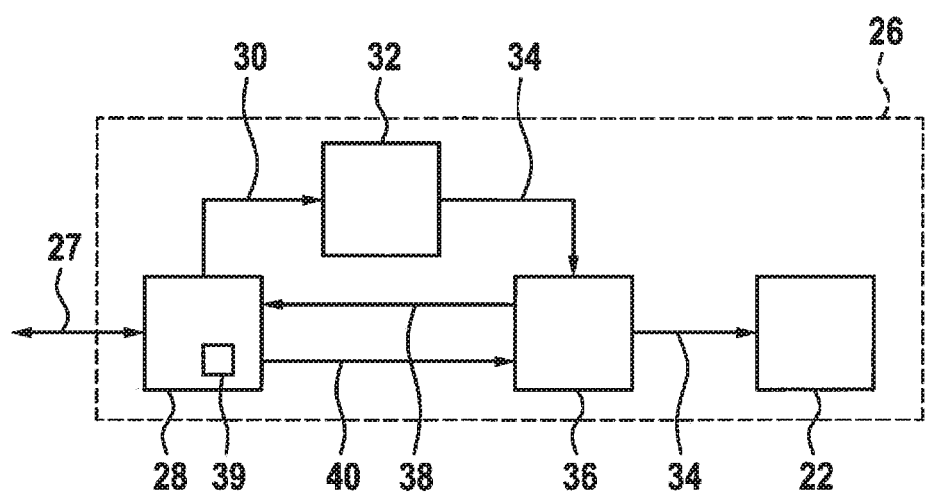
FIG. 2 schematically shows a representation of a display system according to one exemplary embodiment of the present invention.

FIG. 2 schematically shows a representation of a display system 26. Display system 26 is configured to carry out, in particular, the method for checking a validity of image data. Display system 26 includes a controller 28, a graphics controller 32, a monitoring module 36 and a display unit 22, for example, a display, for example, a LCD. Controller 28 communicates with a vehicle bus 27 and in this way receives pieces of information from the vehicle bus, for example, pieces of information to be displayed on a display device 22 according to FIG. 1. Pieces of information may, on the one hand, be pieces of information according to FIG. 1 as well as, for example, symbols, for example, warning symbols, and/or script or letters.

With the aid of these pieces of information 27, controller 28 of display system 26 generates control data 30, which are transmitted to graphics controller 32. With the aid of control data 30, graphics controller 32 generates image data 34, which are conveyed to a monitoring module 36. Monitoring module 36 calculates certain characteristics, for example, a test value for images 34 classified into at least two groups. For this purpose, image data 34 are classified into at least two groups as a function of a color value of image data 34 and/or of a brightness value of image data 34. Monitoring module 36 advantageously transmits ascertained test value 38 of at least one group to controller 28. For this purpose, monitoring module 36 may be directly connected to controller 28. Controller 28 is configured to compare ascertained test value 38 of a group with a predefined test value of the respective group. Predefined test values 38 may be stored, for example, in a memory 39 in controller 28 and/or conveyed via vehicle bus 27. Controller 28 establishes a validity of image data 34 only when ascertained test value 38 of the respective group and predefined test value 38 of the respective group coincide. Controller 28 further establishes an invalidity of image data 34 when ascertained test value 38 of the respective group and predefined test value 38 of the respective group do not coincide. The configuration of image data test 40 and/or the results of the test 40 may, for example, be subsequently transmitted to monitoring module 36.

Alternatively, monitoring module 36 may further also be configured to compare ascertained test value 38 of a group with a predefined test value of the respective group, as well as to establish a validity and/or an invalidity of image data 34 conveyed by graphics controller 32.

If the validity of the image data is established in controller 28 and/or in monitoring module 36, monitoring module 36 is then configured to forward the image data for the display of the image data to display device 22. If a validity of the image data is not established in controller 28 and/or in monitoring module 36, monitoring module 36 and/or controller 28 is/are then configured to generate an error message and/or to at least partially switch off display device 22. The result of the error message would advantageously be to at least partially switch off display device 22. Alternatively, instead of an error message, an interrupt to a second computer may also be triggered, which then stores an error and restarts display system 26 and/or parts of display system 26, for example, controller 28 and/or graphics controller 32 and/or triggers a reset.

Figure 3:
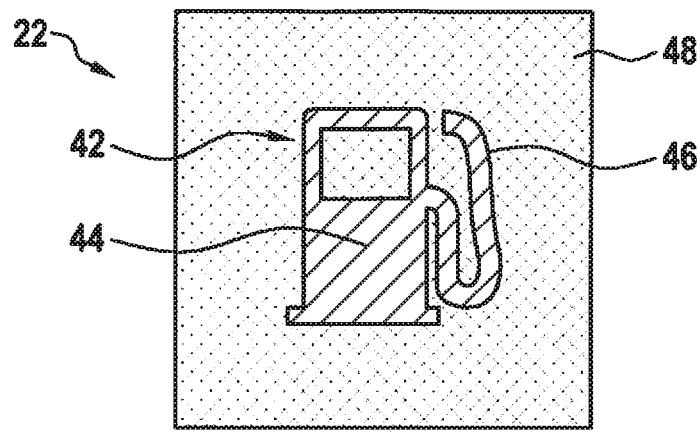
FIG. 3 schematically shows a representation of a symbol on a part of a display device according to one exemplary embodiment of the present invention.

FIG. 3 schematically shows a representation of a symbol 42 on a part of a display device 22. In this exemplary specific embodiment, a symbol of a gas station fuel pump is depicted, which is intended to inform a driver of a vehicle that, for example, the fuel level has reached a limit value and that the driver is to refuel his/her vehicle. Other warning symbols and/or script or letters may also be displayed, however, for example, symbols and/or script or letters of a vehicle safety system, for example, of the distance warner, of the ESP, of the ABS, of the lane keeping assistant or of the vehicle lighting.

Symbol 42 is displayed in a saturated color, which may be in a warning color, in this case, yellow. If a symbol 42 is displayed in a saturated color, image data 44 exhibit a maximum color value 44 for representing symbol 42. In other words, the image data having a maximum color value 44 are displayed, which are associated with a color stamp 44 of the symbol and/or which define the shape of the symbol or are crucial to the shape of the symbol. Furthermore, the image data of symbol 42 may alternatively or additionally have a maximum brightness value 44. In other words, the image data having a maximum brightness value 44 are displayed, define the shape of the symbol or are crucial to the shape of the symbol. These values have, in particular, a transparency of 0%. Maximum color value 44 is provided by a number of bits used for data transmission. For example, the maximum color value may assume a value of 31 when using 5 bits for data transmission, or may assume a maximum color value of 255 when using 8 bits for data transmission.

Edge 46 of symbol 42 is defined by image data, which have no maximum color value and/or no maximum brightness value, but a greater color value and/or brightness value compared to a background 48 of symbol 42. The image data on edge 46 of symbol 42 may be intended to smooth the color transition and/or the brightness transition between the symbol and the background.

Background 48 of symbol 42 on display device 22 may be darker in contrast to the representation of symbol 42. In addition, background 48 of symbol 42 may include a dynamic representation of image data, as a result of which background 48 moves relative to symbol 42.

Figure 4:
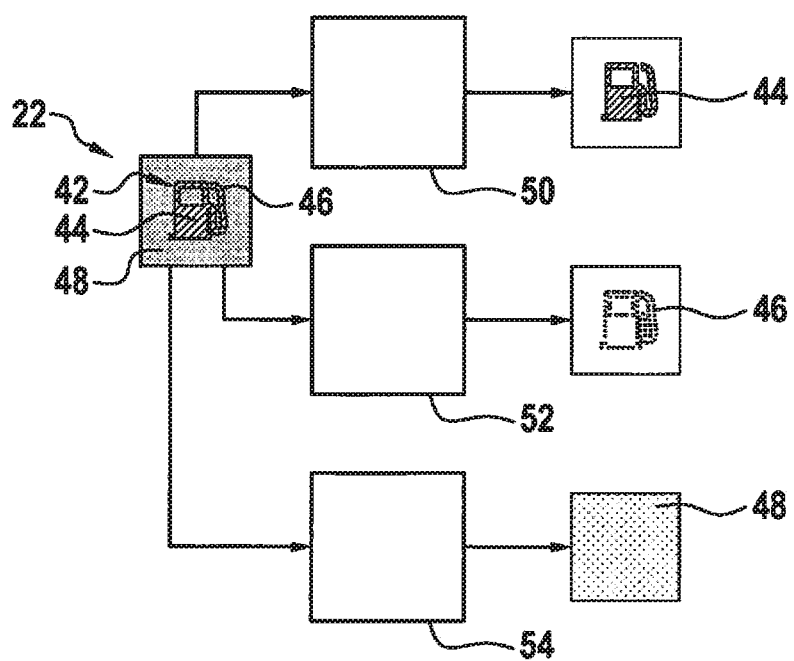
FIG. 4 schematically shows a representation of a classification of the image data into groups according to one exemplary embodiment of the present invention.

FIG. 4 schematically shows a classification of the image data into groups. In this embodiment, the image data are divided into three groups. A first group 50 of the image data is assigned all image data having a maximum color value 44 and/or having a maximum brightness value 44. For this purpose, all image data having a maximum color value 44 and or a maximum brightness value 44 are filtered out. For example, the maximum color value may assume a value of 31 when using 5 bits for data transmission or a maximum color value of 255 when using 8 bits for data transmission. First group 50 of the image data is thus assigned image data which are associated with part 44 of symbol 42, which is represented with a maximum color value and/or a maximum brightness value. In other words, first group 50 is assigned the image data with the aid of which the symbol is represented in a saturated color and/or first group 50 is assigned image data which are associated with a color stamp of the symbol. In other words, the image data associated with a color stamp 44 of the symbol are classified into first group 50 and/or define the shape of the symbol or are crucial to the shape of the symbol.

A second group 52 of image data is assigned all image data having a color value and/or a brightness value between a first predefined limit of a maximum color value and/or of a maximum brightness value and a second predefined limit of a threshold of a color value and/or of a brightness value. The first limit may be the maximum color value and/or the maximum brightness value, the second limit being a predefined color value and/or a predefined brightness value. Accordingly, for second group 52 all image data that are less than a maximum color value and/or a maximum brightness value and greater than a predefined threshold of a color value and/or of a brightness value are filtered out. The maximum color value has a value of 255, for example, when using 8 bits for data transmission. Accordingly, all image data in second group 52 are advantageously less than a value, for example, value 255, and greater than a predefined defined threshold. As a result, second group 52 is assigned all image data associated with edge 46 of symbol 42.

The predefined threshold may be defined as a function of the brightness value. The threshold may, for example, amount to between 25% and 50%, in particular, 30% of the maximum brightness value of the image data.

A third group 54 of image data is assigned all image data having a color value and/or a brightness value below and/or equal to a threshold of a color value and/or a brightness value. In other words, third group 54 is assigned all image data, the values of which are less and may be also equal to a predefined threshold. The threshold is advantageously defined as a function of the brightness value, the threshold amounting to between 25% and 50%, in particular, 30% of the maximum brightness value of the image data. The threshold may have the same value as the second limit and thus the threshold for classifying the image data into second group 52. In this way, all values for third group 54 that are darker compared to the displayed symbol and thus are used for representing background 48, are filtered out. Thus, third group 54 is assigned all image data that are used for the representation of background 48 of symbol 42.

Figure 5:
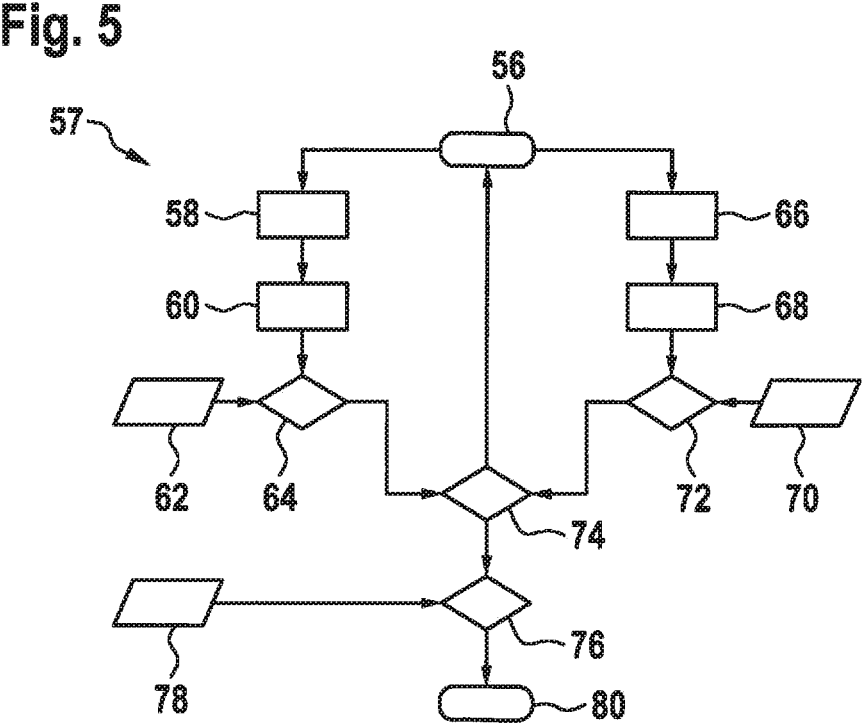
FIG. 5 shows a flow chart of a method according to one exemplary embodiment of the present invention.

FIG. 5 shows a flow chart of a method 57 for checking a validity of image data. The steps of method 57 may be carried out, on the one hand, in one unit, for example, in a controller 28 or in a monitoring module 36 or, on the other hand, individual steps may be carried out in different units, for example, in controller 28 and in monitoring unit 36.

Steps of method 57 in this embodiment are carried out in a controller 28 and additional steps of method 57 are carried out in a monitoring module 36.

In a first step 56, method 57 is started by controller 28. In other words, a recognition of a symbol or a checking of a validity of image data is started. The information relating to the start of method 57 is forwarded to monitoring module 36. According to FIG. 4, the image data are classified into at least two groups as a function of a color value of the image data and/or of a brightness value of the image data by monitoring module 36 and/or by controller 28. The respective thresholds or limits, for example, of the maximum color value and/or of the maximum brightness value and/or the threshold of a color value and/or of a brightness value may be transmitted by controller 28 to monitoring module 36.

In monitoring module 36, a test value for the respective group is accordingly ascertained for at least one group. In this specific embodiment, a test value for a first group 50 of image data is calculated in monitoring module 36 in a second step 58. First group 50 may be assigned all image data having a maximum color value and/or having a maximum brightness value.

The test value of first group 50 may be calculated, for example, by carrying out a cyclical redundancy check, also CRC, via the image data and accordingly ascertaining a CRC sum. This ensures that when the representation of the image data or of the symbol on a display device deviates from a representation of the image data or of the symbol to be expected, for example, due to color errors, transformation or non-display of the symbol, a deviating representation and/or no representation of the image data or of the symbol is immediately recognized, because the ascertained CRC sum of the image data differs from the corresponding image data or because the ascertained CRC sum of the image data differs from the corresponding image data via which the CRC sum has been ascertained.

In a third step 60, the test value of first group 50 ascertained in monitoring module 36 is transmitted to controller 28. Controller 28 receives, in addition, a predefined test value in a fourth step 62 as a reference for first group 50, which may have originally been calculated accordingly using the same method as the ascertained test value of the respective group. The predefined test value has already been ascertained for the respective group and may, for example, be stored in an internal memory 39 in controller 28 and/or conveyed externally to controller 28. In a fifth step 64, controller 28 checks the test value of first group 50 ascertained in monitoring module 36 by comparing the ascertained test value of a, for example, first group 50 with a predefined test value of the respective, for example, first group 50. A validity of the image date of first group 50 is established only when the ascertained test value of first group 50 and the predefined test value of first group 50 coincide. An invalidity of the image data is established when the ascertained test value of first group 50 and the predefined test value of first group 50 do not coincide.

In a sixth step 66, a test value for a second group of image data is calculated in monitoring module 36. A second group 52 may be assigned all image data having a color value and/or a brightness value between a first predefined limit of a maximum color value and/or of a maximum brightness value and a second predefined limit of a threshold of a color value and/or of a brightness value. Image data that represent the edge of the symbol may be located in second group 52.

The test value of second group 52 of image data may be calculated, for example, by totaling or adding up all image data within second group 52. In other words, the number of all image data of second group 52 may be ascertained. In sixth step 66, all image data are accordingly totaled, which lie between a first predefined limit of a maximum color value and/or of a maximum brightness value and a second predefined limit of a threshold of a color value and/or of a brightness value, and are thus associated with the edge of the symbol.

Alternatively, the test value of one or of multiple groups, in this case, second group 52, may be ascertained by ascertaining an average of a color value of the image data of a group and/or of a brightness value of the image data of a group and/or a standard deviation from the positions of the image data of a group. In this way, a statistical measure for the scattering of the image data and/or the focus of the image data within a group may be calculated.

In a seventh step 68, the test value ascertained in monitoring module 36 is transmitted to controller 28. In an eighth step 70, controller 28 receives, in addition, a predefined test value for the second group, which may have originally been calculated accordingly using the same method as the ascertained test value of the respective group. The predefined test value for the respective group has already been ascertained and may, for example, be stored in an internal memory 39 in controller 28 and/or be conveyed externally to controller 28. Controller 28 checks in a ninth step 72 the test value ascertained in monitoring module 36 by comparing the ascertained test value of a group with a predefined test value of the respective group. A validity of the image data of second group 52 is established only when the ascertained test value of second group 52 and the predefined test value of second group 52 coincide. An invalidity of the image data is established when the ascertained test value of second group 52 and the predefined test value of the second group do not coincide.

In one refinement, a validity and/or an invalidity of the image data may be established for capturing tolerances when the ascertained test value of a group deviates by a certain percentage from the predefined test values of the respective group. For example, a validity of the image data may be established when the ascertained test value of a group deviates by less than 5% to 30%, in particular, by 10% from the predefined test value of the second group and/or an invalidity of the image data is established when the ascertained test value of the second group deviates by more than 5% to 30%, in particular, by 10% from the predefined test value of the second group.

In a tenth step 74, the results of the checkings of fifth step 64 and of ninth step 72 are merged in controller 28. It is then checked whether all conditions are met or whether a validity of the checked image data of the respective groups of image data has been established. If a validity of the image data has been established for the image data of all checked groups, in this example, a validity for the image data of first group 50 as well as a validity for the image data of second group 52, method 57 starts again with first step 56, accordingly with the beginning of the recognition of the symbol and/or with the checking of a validity of the image data.

If an invalidity has been established for the image data of one or of multiple groups, then it is checked in an eleventh step 76 whether the symbol is to be displayed on display device 22. The information whether the symbol is to be represented is conveyed to the unit in a twelfth step 78. This information is advantageously provided by the vehicle bus. If in eleventh step 76 controller 28 receives the information that the symbol is not to be represented, method 57 starts again with first step 56. If the symbol is not to be represented on a display device 22, an invalidity of the image data for the respective groups is advantageously irrelevant.

If, however, the warning symbol is to be displayed on display device 22 and if an invalidity of the image data of one or of multiple groups has been established, then the display device is transferred into a safe state in a thirteenth step 80. For this purpose, display device 22 for displaying the image data may, for example, be at least partially or wholly switched off. Alternatively, an error message may be generated. In one refinement, the display and/or display device 22 and/or display system 26 and/or parts or units of display system 26 may be powered down and/or restarted. An interrupt may also be generated.

Second step 58, third step 60, fourth step 62 and fifth step 64, which describe the generation of a test value of first group 50 of the image data, the comparison of the ascertained test value of first group 50 with the predefined test value of first group 50, as well as the establishment of a validity or of an invalidity of the image data of first group 50, are carried out in succession. Sixth step 66, seventh step 68, eighth step 70 as well as ninth step 72, which describe the generation of a test value of second group 52 of the image data, the comparison of the ascertained test value of second group 52 with the predefined test value of second group 52, as well as the establishment of a validity or an invalidity of the image data of second group 52, are likewise carried out in succession. In another specific embodiment, an additional test value of a third group of image data may be ascertained in parallel, the ascertained test value of the third group may be compared with a predefined test value of a third group, and a validity or an invalidity of the image data of a third group may be established.

The steps in method 57 regarding the generation of a test value of a group of the image data, regarding the comparison of the ascertained test value of the respective group with the predefined test value of the respective group, as well as the establishment of a validity or of an invalidity of the image data of the respective group may be carried out in parallel or successively with respect to the generation of a test value of another group of the image data, the comparison of the ascertained test value of the respective other group with the predefined test value of the respective other group, as well as the establishment of a validity or an invalidity of the image data of the respective other group. Accordingly, in this exemplary embodiment, the steps in method 57 of establishing a validity or an invalidity of the image data of first group 50 may be carried out in parallel or successively relative to the steps of establishing a validity or an invalidity of the image data of second group 52.

In one refinement, all steps of method 57 may be carried out in one unit, for example, in a controller 28 or in a monitoring module 36.

In another specific embodiment of method 57, it is possible to use merely the image data of a defined area on a display device 22 for checking the validity of the image data of the defined area on display device 22. This is possible, since it may advantageously already be known at the outset where a symbol is located on a display device 22 or where the symbol is displayed on display device 22.

Figure 6:
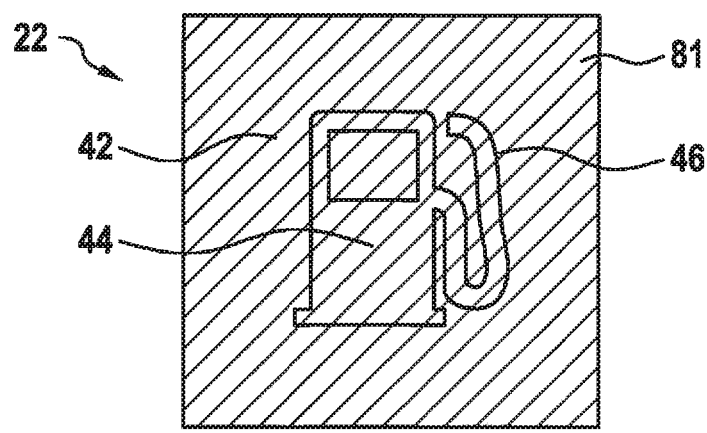
FIG. 6 schematically shows a representation of a symbol on a part of a display device according to one exemplary embodiment of the present invention.

FIG. 6 shows a representation of a symbol on a part of a display device 22 according to FIG. 3. The difference with respect to FIG. 3 is that background 81 of symbol 42 is represented as too bright or with an excessively high brightness value and/or with an excessively high color value. In other words, the image data of background 81 have excessively high brightness values and/or excessively high color values in contrast to the image data of color stamp 44 of the symbol, as a result of which symbol 42 is hardly distinguishable by an observer from background 81. An invalidity of the image data in this example, is established in FIG. 6 with the aid of the method according to FIG. 5.

A second group 52 of the image data according to FIG. 4 is assigned all image data having a color value and/or a brightness value between a first predefined limit of a maximum color value and/or of a maximum brightness value and a second predefined limit of a threshold of a color value and/or of a brightness value. Furthermore, a test value for the second group is ascertained from the image data of second group 52, the ascertained test value of the second group being compared with a predefined test value of the second group. In this exemplary embodiment, the ascertained test value of the second group and the predefined test value of the second group do not coincide, for which reason an invalidity of the image data is established. For example, for ascertaining the test value, the number of the image data in the second group is ascertained, in this specific embodiment a test value being ascertained which does not coincide with the predefined test value of the second group and, in this case, for example, is greater than the predefined test value of the second group. Accordingly, there are more image data in the second group than would actually be correct or provided. Accordingly, an invalidity of the image data of the second group is established.

The checking of the validity or the invalidity of the image data may likewise be carried out with the image data of a third group of the image data according to FIG. 4. In this case, a third group of the image data is assigned all image data having a color value and/or a brightness value below and/or equal to a threshold of a color value and/or of a brightness value. A test value for the third group is also ascertained from the image data of the third group, the ascertained test value of the third group being compared with a predefined test value of the third group. In this exemplary embodiment, the ascertained test value of the third group and the predefined test value of the third group do not coincide, for which reason an invalidity of the image data is established. For ascertaining the test value, for example, the number of the image data in the third group is ascertained, in this specific embodiment a test value being ascertained, which does not coincide with the predefined test value of the third group and, in this case, is less than the predefined test value of the third group. Accordingly, there are fewer image data in the third group than would actually be correct or provided. Accordingly, an invalidity of the image data of the third group is established.

FIG. 7 schematically shows a representation of an ascertainment of a maximum color value of the image data. In this exemplary specific embodiment, the image data are processed to compensate for manufacturing tolerances of display device 22 or of the display in the color representation. A white balance is applied for this purpose. The result of the white balance is that the maximum color value of the image data changes for display device 22 in display system 26. The maximum color value would have a value of 255 when using 8 bits for data transmission; however, this may be reduced when applying a white balance. When using three basic colors red, green and blue, it is possible to variously adjust the maximum color value for each of the three basic colors. Accordingly, for each of the basic colors red, green and blue, the image data are also classified in each case into at least two groups.

Figure 7A:
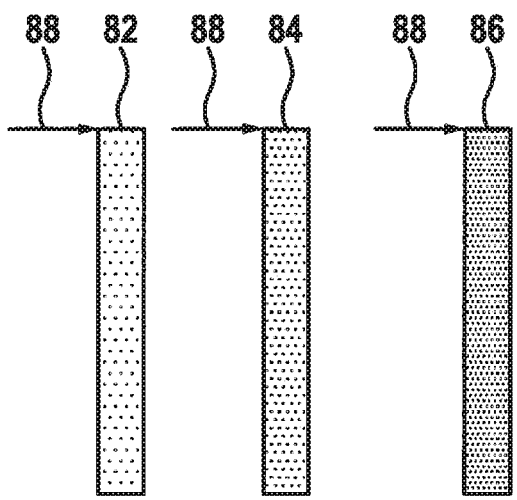
FIG. 7 schematically shows a representation of an ascertainment of a maximum color value of the image data according to one exemplary embodiment of the present invention.

Maximum color value 88 and/or brightness value, in this case 255, for each of the three basic colors red 82, green 84 and blue 86 prior to a white balance is depicted in FIG. 7a.

Figure 7B:
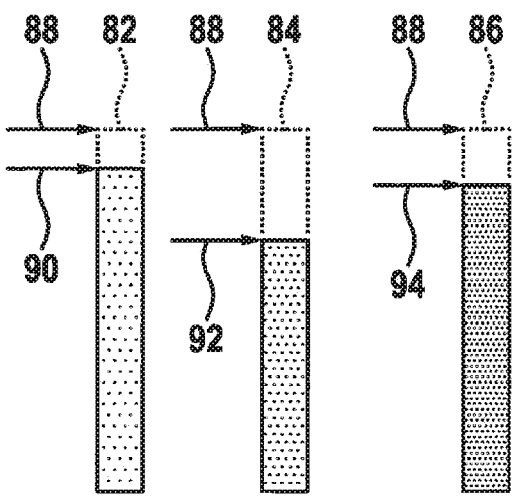

The maximum possible, newly calibrated color value and/or brightness value for each of the three basic colors red 82, green 84 and blue 86, which has been processed with the aid of a white balance and has thus been reduced to lower values in contrast to the previous maximum color values and/or brightness values, in this case, 255, is depicted in FIG. 7b. For basic color red 82, maximum possible color value 88 having value 255 is reduced to a second, calibrated maximum color value 90, for example, having value 250. For basic color green 84, maximum possible color value 88 having value 255 is reduced to a third, calibrated maximum color value 92, for example, having value 245. For basic color blue 86, maximum possible color value 88 having value 255 is reduced to a fourth, calibrated maximum color value 94, for example, having value 249. The difference with respect to maximum possible color value 88 having value 255 is depicted with the aid of a dotted line for the three basic colors red 82, green 84 and blue 86.

The new, calibrated maximum color value of the three basic colors red 82, green 84 and blue 86 are known during the white balance of display device 22 and are conveyed to a unit of display system 26. Thus, when classifying the image data into the different groups, for example, into first group 50, in which all image data are classified according to FIG. 4 that have a maximum color value, these new, calibrated maximum color values may each be used for the three basic colors red 82, green 84 and blue 86. This may also be used for the classification of the image data into second group 52 according to FIG. 4. Alternatively, the first maximum color value may be used for each of the basic colors red, green and blue for classifying the image data into the second group, the changed values being compensated for by the white balance with the aid of a tolerance threshold for establishing a validity or invalidity according to FIG. 5.

What is claimed is:

1. A method comprising:
   a controller obtaining image data;
   the controller classifying the image data into at least two groups as a function of one or both of (a) respective color values of respective data elements of the image data and (b) respective brightness values of the respective data elements of the image data;
   for each of at least one of the groups:
      the controller ascertaining a respective test value based on the respective data elements of the image data of the respective group; and
      the controller determining whether the respective group is valid by comparing the respective ascertained test value of the respective group with a respective predefined test value of the respective group to thereby determine whether the respective ascertained test value of the respective group matches or has at least a predefined threshold similarity to the respective predefined test value of the respective group, by which the respective group is determined to be valid; and
   the controller controlling a display device, which is configured for display of an image represented by the image data, depending on the validity determination;
   wherein any one or more of the following features (1)-(3):
      (1) for each respective one of one or more of the at least one of the groups, one or both of the following features (a) and (b):
         (a) the respective ascertained test value of the respective group is a cyclical redundancy check (CRC) value calculated from the respective data elements of the respective group; and
         (b) the respective ascertained test value of the respective group is a standard deviation value characterizing a positional concentration of the data elements of the respective group;
      (2) the at least one of the groups includes at least two groups for which their respective ascertained test values are ascertained using different ascertainment methods; and
      (3) the at least one of the groups includes at least three groups, a first one of which includes data elements of the image data having respective values categorized as symbol values, a second one of which includes data elements of the image data having respective values categorized as background values, and a third one of which includes data elements of the image data having respective values categorized as border values of an edge transitioning between symbol and background.

2. The method of claim 1, wherein the classifying includes assigning one of the at least two groups all data elements of the image data having one or more of a maximum color value and a maximum brightness value.

3. The method of claim 1, wherein the classifying includes assigning one of the at least two groups all data elements of the image data having one or more of:
   a color value between two predefined threshold color values; and
   a brightness value between two predefined threshold brightness values.

4. The method of claim 1, wherein the classifying includes assigning one of the at least two groups all data elements of the image data having one or more of:
   a color value below a threshold color value and
   a brightness value below a threshold brightness value.

5. The method of claim 1, wherein the classifying includes assigning one of the at least two groups all data elements of the image data having a brightness value that is between 25% and 50% of a maximum brightness value.

6. The method of claim 1, wherein the respective ascertained test value of each of one or more others of the at least one of the groups is a number of the data elements of all of the image data that have been classified as belonging to the respective group.

7. The method of claim 1, wherein the at least one of the groups includes two groups and the controlling of the display device is performed in response to a determination of a satisfaction of a condition that both of the two groups are determined to be valid based on the comparisons performed for both of the two groups.

8. The method of claim 1, wherein the image data subjected to the validity determination is a subset of image data used for the display of the image by the display device and corresponds to a predefined sub-area of the image, other portions of the image data used for the display, on the display device, of a portion of the image that is outside of the defined area not being subjected to the validity determination.

9. The method of claim 1, wherein the validity determination includes performing the comparison to determine whether the respective ascertained test value has at least the predefined threshold similarity, the predefined threshold similarity being defined as not more than a 5% to 30% deviation.

10. The method of claim 1, wherein one or both of an error message and an interrupt is generated if the validity of the image data is not established.

11. The method of claim 1, wherein the controlling includes partially or fully switching off the display device if the validity of the image data is not established.

12. The method of claim 1, wherein the validity determination includes performing the comparison to determine whether the respective ascertained test value has at least the predefined threshold similarity, the predefined threshold similarity being defined as not more than a 10% deviation.

13. The method of claim 1, wherein the respective ascertained test value of the respective group of the one or more of the at least one of the groups is the cyclical redundancy check (CRC) value calculated from the respective data elements of the respective group.

14. The method of claim 1, wherein the respective ascertained test value of the respective group of the one or more of the at least one of the groups is the standard deviation value characterizing the positional concentration of the data elements of the respective group.

15. The method of claim 1, wherein the respective ascertained test value of the respective group of the one or more of the at least one of the groups is an average color value of the data elements of the respective group.

16. The method of claim 1, wherein the respective ascertained test value of each of one or more others of the at least one of the groups is an average brightness value of the data elements of the respective group.

17. The method of claim 1, wherein the at least one of the groups includes the at least two groups for which their respective ascertained test values are ascertained using the different ascertainment methods.

18. The method of claim 1, wherein the at least one of the groups includes the at least three groups, the first one of which includes the data elements of the image data having the respective values categorized as the symbol values, the second one of which includes the data elements of the image data having the respective values categorized as the background values, and the third one of which includes the data elements of the image data having the respective values categorized as the border values of the edge transitioning between the symbol and the background.

19. The method of claim 1, wherein:
the respective ascertained test value of the respective group of the one or more of the at least one of the groups is the CRC value calculated from the respective data elements of the respective group; and
the respective ascertained test value of another one of the at least one of the groups is a number of the data elements of all of the image data that have been classified as belonging to the other group.

20. A control unit of a display device, the control unit comprising:
a processor, wherein the processor is configured to:
obtain image data;
classify the image data into at least two groups as a function of one or both of
(a) respective color values of respective data elements of the image data and (b) respective brightness values of the respective data elements of the image data;
for each of at least one of the groups:
ascertain a respective test value based on the respective data elements of the image data of the respective group; and
determine whether the respective group is valid by comparing the respective ascertained test value of the respective group with a respective predefined test value of the respective group to thereby determine whether the respective ascertained test value of the respective group matches or has at least a predefined threshold similarity to the respective predefined test value of the respective group, by which the respective group is determined to be valid; and
control the display device, which is configured for display of an image represented by the image data, depending on the validity determination;
wherein any one or more of the following features (1)-(3):
(1) for each respective one of one or more of the at least one of the groups, one or both of the following features (a) and (b):
(a) the respective ascertained test value of the respective group is a cyclical redundancy check (CRC) value calculated from the respective data elements of the respective group; and
(b) the respective ascertained test value of the respective group is a standard deviation value characterizing a positional concentration of the data elements of the respective group;
(2) the at least one of the groups includes at least two groups for which their respective ascertained test values are ascertained using different ascertainment methods; and
(3) the at least one of the groups includes at least three groups, a first one of which includes data elements of the image data having respective values categorized as symbol values, a second one of which includes data elements of the image data having respective values categorized as background values, and a third one of which includes data elements of the image data having respective values categorized as border values of an edge transitioning between symbol and background.

21. The control unit of claim 20, wherein the respective ascertained test value of the respective group of the one or more of the at least one of the groups is the cyclical redundancy check (CRC) value calculated from the respective data elements of the respective group.

22. The control unit of claim 20, wherein the respective ascertained test value of the respective group of the one or more of the at least one of the groups is the standard deviation value characterizing the positional concentration of the data elements of the respective group.

23. The control unit of claim 20, wherein the respective ascertained test value of the respective group of the one or more of the at least one of the groups is an average color value of the data elements of the respective group.

24. The control unit of claim 20, wherein the respective ascertained test value of each of one or more others of the at least one of the groups is an average brightness value of the data elements of the respective group.

25. The control unit of claim 20, wherein the at least one of the groups includes the at least two groups for which their respective ascertained test values are ascertained using the different ascertainment methods.

26. The control unit of claim 20, wherein the at least one of the groups includes the at least three groups, the first one of which includes the data elements of the image data having the respective values categorized as the symbol values, the second one of which includes the data elements of the image data having the respective values categorized as the background values, and the third one of which includes the data elements of the image data having the respective values categorized as the border values of the edge transitioning between the symbol and the background.

27. The control unit of claim 20, wherein:
the respective ascertained test value of the respective group of the one or more of the at least one of the groups is the CRC value calculated from the respective data elements of the respective group; and
the respective ascertained test value of another one of the at least one of the groups is a number of the data elements of all of the image data that have been classified as belonging to the other group.

28. A display system comprising:
a display device; and
a processor, wherein the processor is configured to:
    obtain image data;
    classify the image data into at least two groups as a function of one or both of (a) respective color values of respective data elements of the image data and (b) respective brightness values of the respective data elements of the image data;
    for each of at least one of the groups:
        ascertain a respective test value based on the respective data elements of the image data of the respective group; and
        determine whether the respective group is valid by comparing the respective ascertained test value of the respective group with a respective predefined test value of the respective group to thereby determine whether the respective ascertained test value of the respective group matches or has at least a predefined threshold similarity to the respective predefined test value of the respective group, by which the respective group is determined to be valid; and
    control the display device, which is configured for display of an image represented by the image data, depending on the validity determination;
wherein any one or more of the following features (1)-(3):
    (1) for each respective one of one or more of the at least one of the groups, one or both of the following features (a) and (b):
        (a) the respective ascertained test value of the respective group is a cyclical redundancy check (CRC) value calculated from the respective data elements of the respective group; and
        (b) the respective ascertained test value of the respective group is a standard deviation value characterizing a positional concentration of the data elements of the respective group;
    (2) the at least one of the groups includes at least two groups for which their respective ascertained test values are ascertained using different ascertainment methods; and
    (3) the at least one of the groups includes at least three groups, a first one of which includes data elements of the image data having respective values categorized as symbol values, a second one of which includes data elements of the image data having respective values categorized as background values, and a third one of which includes data elements of the image data having respective values categorized as border values of an edge transitioning between symbol and background.

29. The display system of claim 28, wherein the respective ascertained test value of the respective group of the one or more of the at least one of the groups is the cyclical redundancy check (CRC) value calculated from the respective data elements of the respective group.

30. The display system of claim 28, wherein the respective ascertained test value of the respective group of the one or more of the at least one of the groups is the standard deviation value characterizing the positional concentration of the data elements of the respective group.

31. The display system of claim 28, wherein the respective ascertained test value of the respective group of the one or more of the at least one of the groups is an average color value of the data elements of the respective group.

32. The display system of claim 28, wherein the respective ascertained test value of each of one or more others of the at least one of the groups is an average brightness value of the data elements of the respective group.

33. The display system of claim 28, wherein the at least one of the groups includes the at least two groups for which their respective ascertained test values are ascertained using the different ascertainment methods.

34. The display system of claim 28, wherein the at least one of the groups includes the at least three groups, the first one of which includes the data elements of the image data having the respective values categorized as the symbol values, the second one of which includes the data elements of the image data having the respective values categorized as the background values, and the third one of which includes the data elements of the image data having the respective values categorized as the border values of the edge transitioning between the symbol and the background.

35. The display system of claim 28, wherein:
the respective ascertained test value of the respective group of the one or more of the at least one of the groups is the CRC value calculated from the respective data elements of the respective group; and
the respective ascertained test value of another one of the at least one of the groups is a number of the data elements of all of the image data that have been classified as belonging to the other group.

* * * * *